March 13, 1956

R. LUCIEN 2,737,966

PRESSURE REGULATOR

Filed Aug. 13, 1952

Inventor
RENE LUCIEN
By
Haseltine, Lake & Co.
Agents

United States Patent Office 2,737,966
Patented Mar. 13, 1956

2,737,966

PRESSURE REGULATOR

René Lucien, Paris, France, assignor to Societe d'Inventions Aeronautiques et Mecaniques S. I. A. M., Fribourg, Switzerland, a corporation of Switzerland Application August 13, 1952, Serial No. 304,076

Claims priority, application France October 15, 1951

2 Claims. (Cl. 137—108)

This invention has for its object to provide a pressure regulator intended to be connected up to hydraulic control installations, in particular those which are supplied with pressure liquid from a hydraulic accumulator which is coupled for replenishment to one or more pumps.

This regulator functions by diverting to the exhaust tank through an automatically-controlled by-pass part of the output of the pump or pumps whenever the pressure in the accumulator reaches a predetermined value, called the overflow pressure and hereinafter designated by the symbol Po, and by closing the by-pass when the accumulator pressure falls to a lower determined value, called the closure pressure and hereinafter designated by the symbol Pf.

The pressure regulator affords, by reason of the arrangement of its operative parts to this end, the important advantage of separate functioning of the means which initiates the opening of the by-pass and the means which assures its closure, so that full control of the closing pressure as well as of the opening pressure is provided.

The regulator according to the invention has, in addition, the advantage of a weak operational movement, reducing shock blows to a considerable degree. Furthermore, the regulator is capable of being reduced to practice in a construction which has very little bulk and a small weight.

This regulator is characterised essentially by the following combination:

1. A main valve interposed between two chambers, one connected to the exhaust tank and the other connected to the pump delivery, the opening of this main valve thus short-circuiting to exhaust the conduit between the pump and the accumulator;

2. Arrangements which ensure control of the opening and closing of the main valve and comprise:

(a) An auxiliary valve, for initiating unloading of the pump, which valve being constantly subject to the delivery pressure opens whenever said pressure, by attaining the valve Po, balances the effort exerted on the auxiliary valve by an opposing control spring, the opening of the auxiliary valve having the effect of equalising the pressures on both sides of the main valve;

(b) An annular chamber surrounding the main valve and which, being always in communication with the pump delivery line, ensures opening of the main valve as soon as the aforesaid equalisation of pressures occurs, the pump then delivering direct to the exhaust tank;

(c) A piston which, without taking part in the opening of the said auxiliary valve, is subjected on one side to the accumulator pressure and on the other to the pressure obtaining in the pump delivery line, this piston thus being under balanced pressure while the pump is delivering to the accumulator, and in addition controlling the closing of the auxiliary valve.

According to a characteristic feature of the invention, the pressure in the pump delivery line is transmitted to the auxiliary valve and at the same time to the aforesaid piston by a common chamber connected to the pump delivery line through the intermediary of a duct formed in the main valve.

The invention is illustrated in one practical form, by way of example only, in the accompanying drawing.

Figure 1:
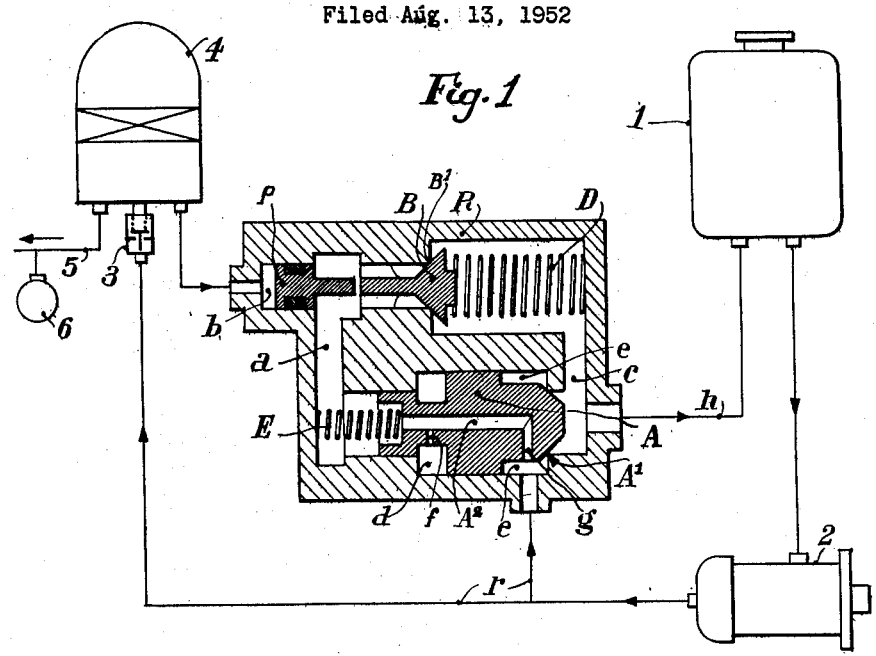
Figure 1 shows the regulator in longitudinal section, with the parts in the positions corresponding to delivery from the pump to the accumulator.

In these figures, there is shown a reservoir or exhaust tank 1, a pump 2 which draws liquid from the exhaust tank and delivers to an accumulator 4 through a non-return valve 3, a fluid line 5 leading from the accumulator to some hydraulically-operated apparatus (not shown), and a pressure gauge 6 connected to the line 5.

The pressure regulator R is divided internally into chambers $a$, $c$, $d$, $e$, by a central partition and a system of two valves, the one a main valve A and the other an auxiliary valve B, subjected to the action of control springs E and D respectively which urge the valves on to their seats $A^1$ and $B^1$ respectively.

The chambers $c$ and $e$ are respectively connected to the reservoir 1 and to the delivery line of the pump 2 by conduits $h$ and $r$ respectively.

The valve A is bored through to form a central duct $A^2$ which affords communication between the chamber $a$ on the one hand and the chamber $e$ and conduit $r$ on the other hand by way of an orifice $g$ at the end of the duct $A^2$. Another orifice $f$ connects the duct $A^2$ to the annular chamber $d$ surrounding the stem of the valve A.

Facing the stem of the valve B is the rod of a piston P which works in a chamber $b$ and is constantly subjected to the pressure obtaining in the accumulator 4 through a conduit connecting said accumulator with the chamber $b$.

The pressure regulator operates as follows:

In the position shown in Figure 1, the pump 2 delivers to the accumulator 4 and, consequently, to the hydraulically-operated apparatus connected thereto, the valves A and B being held on their seats by their respective control springs.

In the chambers $a$ and $b$ the pressures are the same because the chamber $a$ communicates with the pump delivery line through the duct $A^2$ in the main valve A and the chamber $e$, while the chamber $b$ communicates with the accumulator 4, which is being charged by the delivery line.

Figure 2:
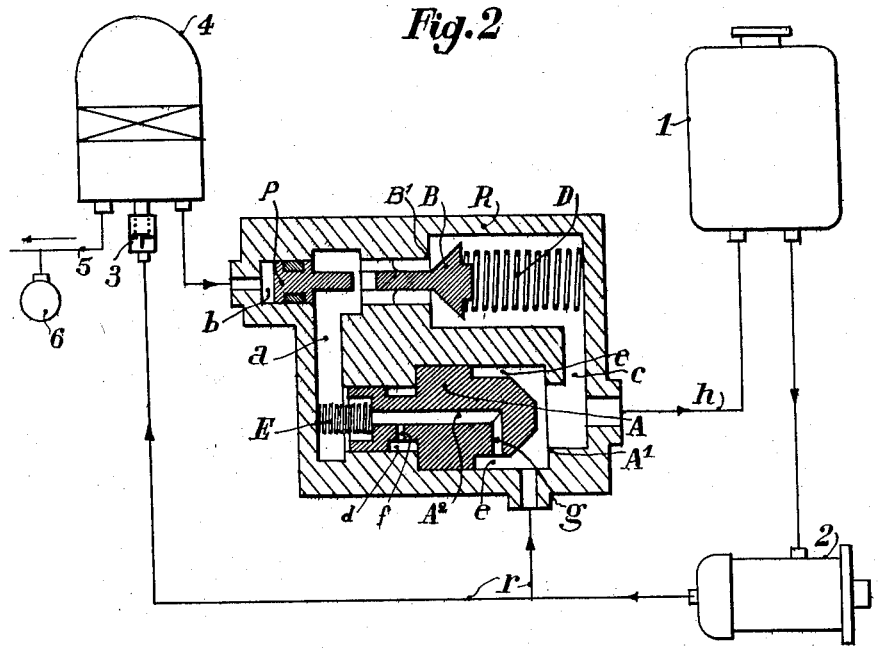
Figure 2 is a corresponding view showing the parts in the positions they occupy when the pump delivery is by-passed to the exhaust tank.

When the pressure in the accumulator and the delivery line attains the value Po, which value is determined by the cross-section of the auxiliary valve B and the force exerted by the control spring D, the spring D is overcome and the valve B opens (Figure 2).

Opening of the valve B brings about a fall in pressure in the chamber $a$. Accordingly, the valve A subjected on one side to the pressure obtaining in the chamber $e$ ceases to be held in balance by the pressure in the chamber $a$ and moves to the open position. At the same time, the piston P, being no longer held in balance by the pressure in the chamber $a$, moves toward the valve B until its rod abuts against the stem of the valve and thereby holds the valve B open.

It will be obvious that the fall in pressure in the delivery to the accumulator, caused by opening of the valve A, results in closing of the non-return valve 3 of the accumulator.

Also, it will be noted that, in its opening movement, the valve A considerably reduces the volume of the chamber $a$, the surplus liquid escaping through the orifice $f$, which damps the valve movement and thereby prevents shock blows due to too vigorous valve operation.

When the above movements have been effected, following upon arrival of the accumulator pressure at the value Po, equilibrium is again achieved.

The pump delivers into the reservoir 1, while the by-pass is open, through the conduit h. During this period the pump is unloaded.

Now, when the pressure in the accumulator, and the circuit to the hydraulically-operated apparatus fed thereby, falls to the valve Pf, which should, in general, be chosen to be slightly less than the valve Po and is such that the spring D is able to repel the piston P, the valve B closes again under the action of the said spring. The unbalance of pressure between the chambers a and e then permits the spring E to return the main valve A on to its seat, which closes the by-pass between the pump delivery and the reservoir 1, thereby putting the pump back into circuit to supply the accumulator and the hydraulically-operated apparatus connected thereto: thus, this is the action of putting the pump back on load.

It will be seen that it is the cross-section of the piston P which is the determining factor controlling the pressure at which the pump is put back on load. It is thus possible to give the difference between the pressures Po and Pf any predetermined value, by suitable choosing the proportions of the cross-sections of the piston P and the seat of the valve B. The fact that the cross-section of the piston P has no influence on the moment of opening of the auxiliary valve B brings about achievement of the desired characteristic of the invention as hereinbefore set forth namely independent functioning of the means controlling opening and the means controlling closing of the bypass.

It is of very great importance to be able to regulate with precision the characteristic of the valve A as regards its time of opening, in order to prevent the occurrence of surges of pressure which would be prejudicial to the good operation of the hydraulic installation as a whole. The valve A is in balance when the pressures in the chambers e and d are equal. The opening characteristic of the valve A therefore depends directly upon the characteristic of pressure variation in the chamber d. This pressure variation characteristic is easily decided by choosing suitable dimensions for the orifice f.

Thus the operation of the regulator does not involve excessive shock blows because at the opening of the auxiliary valve B an initial pressure drop occurs which is then followed by the opening of the main valve, which provides a dash-pot effect.

I claim:

1. A pressure regulator of the character described for operation with a pump, a pressure fluid accumulator, a fluid reservoir and a fluid circuit connecting the fluid reservoir, pump and pressure fluid accumulator in series comprising a casing, a first chamber inside the casing in communication with the fluid reservoir, a second chamber inside the casing having a bore in one wall thereof with one end in communication with the pressure fluid accumulator, a dividing wall separating said first and second chambers, a piston mounted in the bore and having a rod extending into the second chamber, a first bore in said dividing wall between the two chambers, a differential piston in said first bore with a head of lesser diameter than the main body thereof to define an annular space between the said head and first bore, a main valve defined by the end surface of said head and a seating defined by said dividing wall and separating the first bore from the first chamber, the tube opening into the annular space and branch connected to the fluid circuit between the pump and the accumulator, a return spring for the main valve positioned inside the second chamber so that the pressure within said second chamber normally equals the pressure in said pressure fluid accumulator, a channel inside the main valve between the annular space and the second chamber, a communication passage between the two chambers, an auxiliary valve having a seating defined by opening of the communication passage into the first chamber and a stem coaxial with the piston rod in the first bore of the second chamber, and a return spring for the auxiliary valve positioned inside the first chamber, said return spring being responsive to a predetermined pressure for permitting said auxiliary valve to open whereby the pressure in said second chamber decreases, said main valve being responsive to the decrease of pressure for opening so that said first bore communicates with said first chamber to by-pass said pressure fluid accumulator, said piston being responsive to the decrease of pressure for moving into contact with said stem to maintain said auxiliary valve in open condition.

2. A pressure regulator according to claim 1 wherein the differential piston is provided with a bore communicating with the second chamber through a further bore of lesser diameter than the first bore, the differential piston body having a terminal portion with a diameter equal that of the further bore and an intermediate portion between the terminal portion and the portion of same diameter as the first bore having a lesser diameter than the terminal portion, and with a radial channel of small cross-section in the intermediate portion between the outside wall of the intermediate portion and the channel inside the main valve, said intermediate portion defining with said first bore a pressure chamber for which said radial channel is an escape to provide damping for the operation of said main valve.

References Cited in the file of this patent

UNITED STATES PATENTS

| | | |
|---|---|---|
| 2,244,212 | Patton | June 3, 1941 |
| 2,316,445 | Marshall | Apr. 13, 1943 |
| 2,388,820 | Bonnell | Nov. 13, 1945 |
| 2,393,571 | Schultz | Jan. 22, 1946 |
| 2,420,890 | MacDuff | May 20, 1947 |
| 2,642,887 | Renick | June 23, 1953 |
| 2,650,605 | Mackie | Sept. 1, 1953 |